Figure 1:
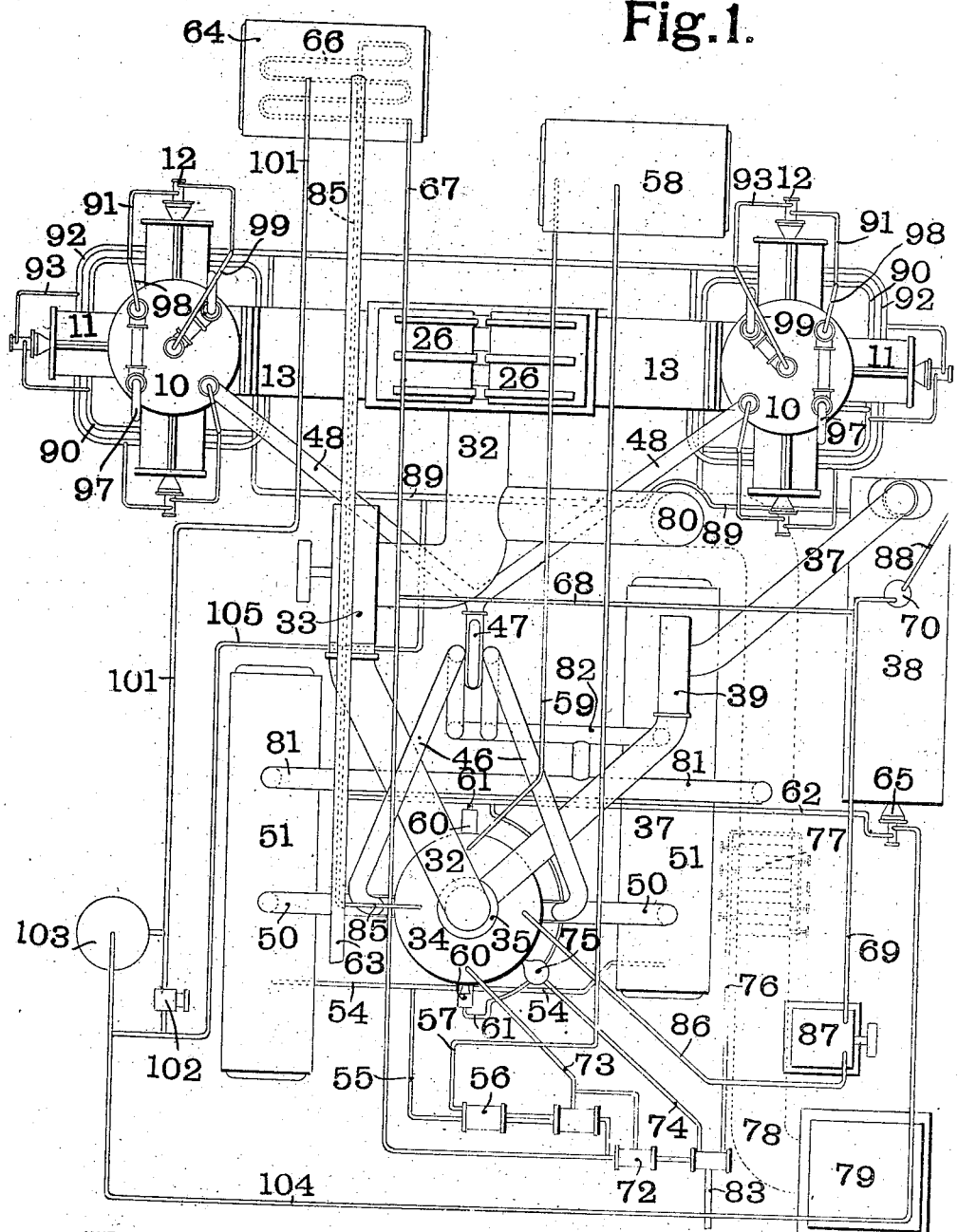

No. 891,630. PATENTED JUNE 23, 1908.
F. L. McGAHAN.
PROCESS OF SMELTING ORES.
APPLICATION FILED JUNE 28, 1905.

5 SHEETS—SHEET 2.

WITNESSES:
W. A. Alexander.
Fred C. Henke.

INVENTOR
Fred L. McGahan.
BY
Fowler & Bryson
ATTORNEYS

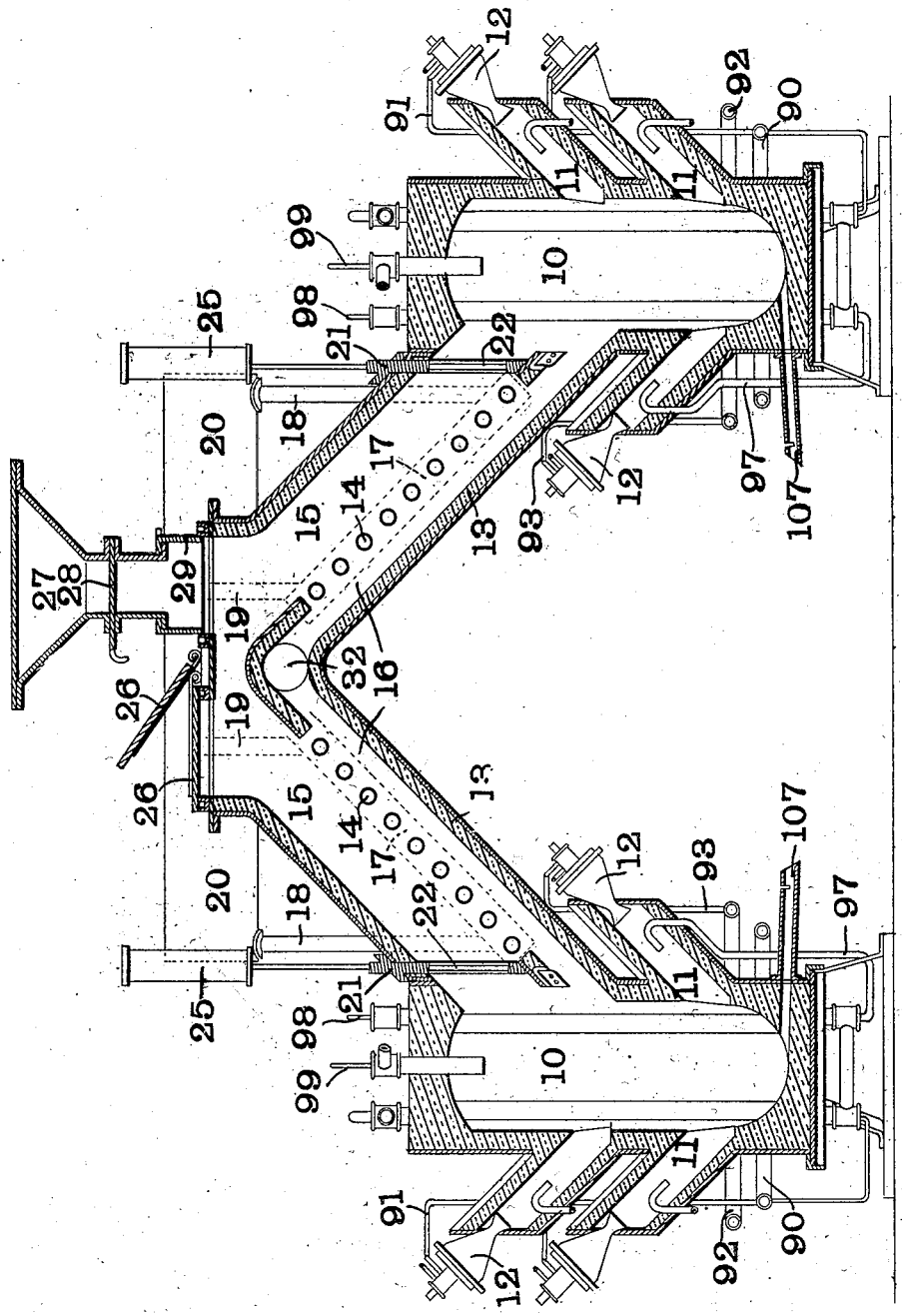

No. 891,630.
PATENTED JUNE 23, 1908.
F. L. McGAHAN.
PROCESS OF SMELTING ORES.
APPLICATION FILED JUNE 28, 1905.
5 SHEETS—SHEET 4.
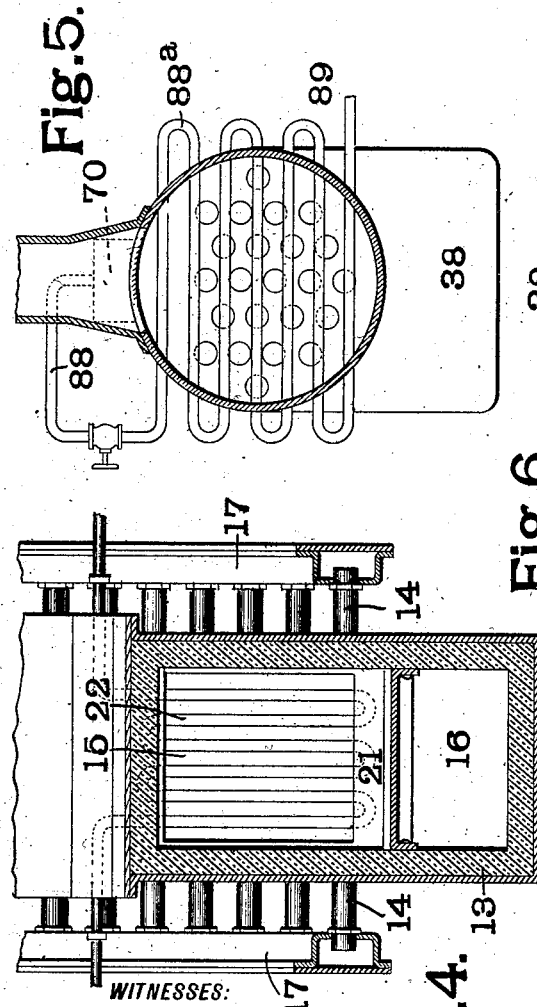
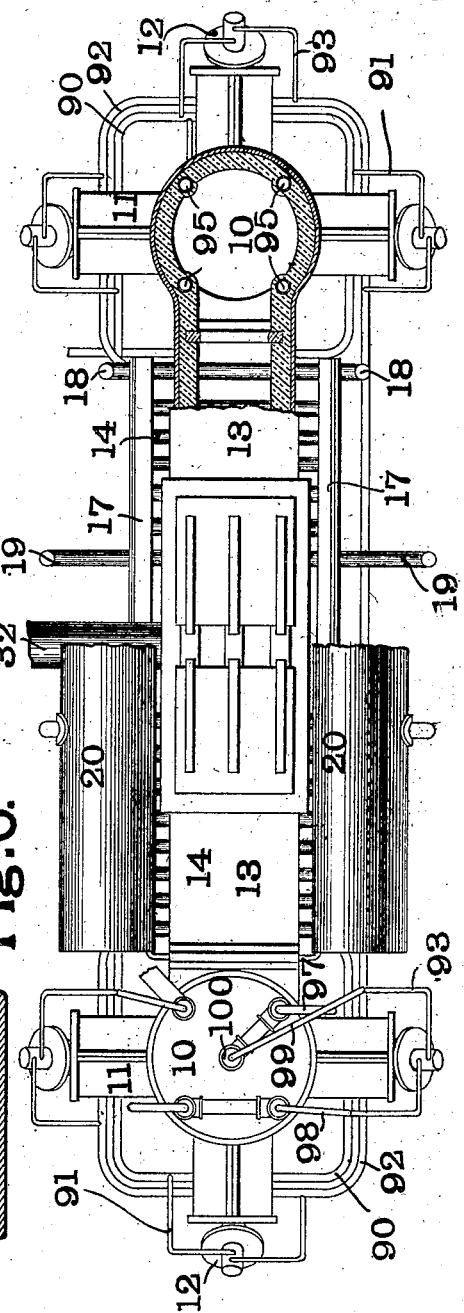
WITNESSES:
W. A. Alexander.
Fred C. Henke.
INVENTOR
Fred L. McGahan.
BY
Fowler & Bryan
ATTORNEY

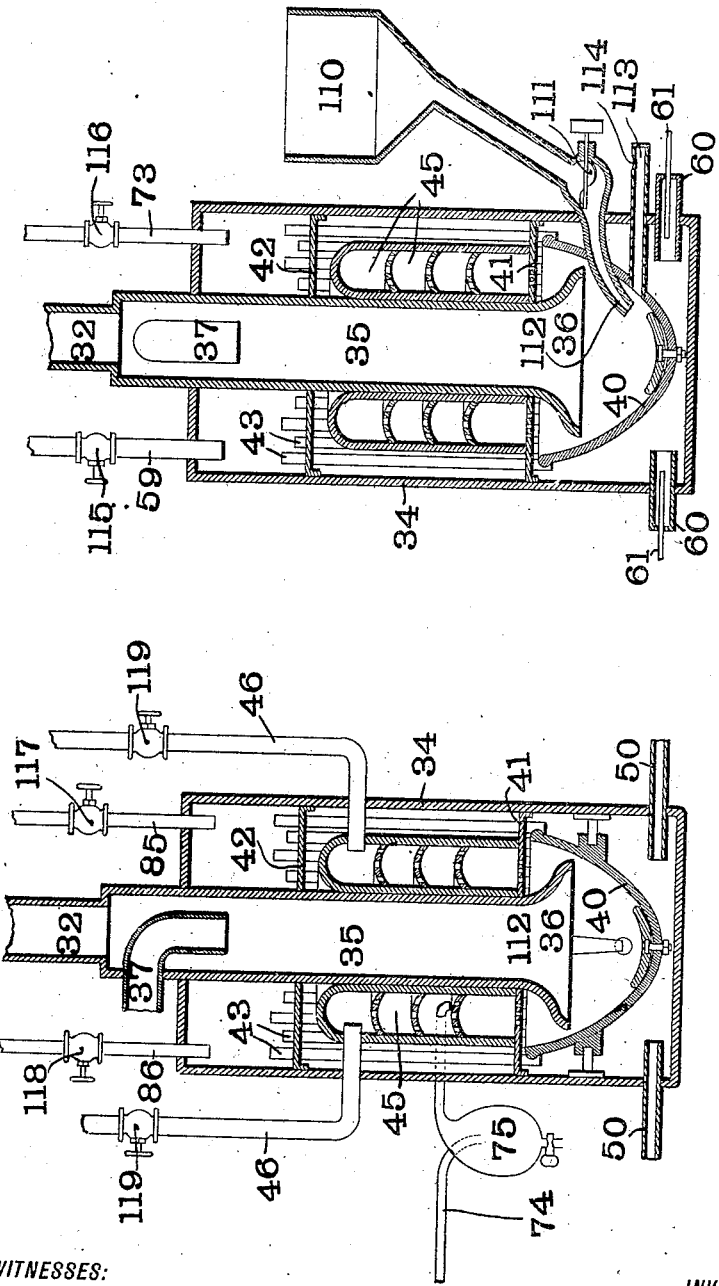

UNITED STATES PATENT OFFICE.

FREDERICK L. McGAHAN, OF ST. LOUIS, MISSOURI.

PROCESS OF SMELTING ORES.

No. 891,630.

Specification of Letters Patent.

Patented June 23, 1908.

Application filed June 28, 1905. Serial No. 267,400.

*To all whom it may concern:*

Be it known that I, FREDERICK L. MC-GAHAN, a citizen of the United States, residing at the city of St. Louis, State of Missouri, have invented a certain new and useful Process of Smelting Ore, of which the following is such a full, clear, and exact description as will enable any one skilled in the art to which it appertains to make and use the same, reference being had to the accompanying drawings, forming part of this specification.

My invention relates to smelting of ores, and more particularly to a process in which certain unconsumed gases and products of combustion from the smelting furnace are not discharged into the admixture in the usual manner, but after being suitably treated are returned to the furnace.

One important feature of my process is that I employ successively a number of different temperatures, each higher than the one before, so as to separate various metals and metallic substances one at a time from ores containing more than one metal.

By returning the products of combustion and unconsumed gases I prevent the loss of heat and fuel, and also retain such volatilized metallic substances as would otherwise result from their discharge into the admixture. The products of combustion from the furnace, while containing a certain amount of fuel do not, as a rule, contain sufficient fuel to carry on the process of smelting, hence I add to said products after they are withdrawn from and before they are again returned to the furnace, other fuel, either in a powdered or liquid form. I also add to said products of combustion a certain amount of steam, which, during the process, is decomposed into its constituent elements. In this manner I am enabled to supply sufficient fuel and oxygen to the furnace to carry on the process of smelting without admitting any, or at least only a very small amount, of atmospheric air to the furnace; consequently during the full operation of the furnace it contains but little or no nitrogen. I find that this has an important bearing upon the chemical reactions taking place within the furnace and enables me to obtain substantially the same results that are obtained in the electric smelting furnace.

The construction of the furnace by means of which I prefer to carry on my process, briefly stated is as follows: I provide a pair of smelting chambers, preferably cylindrical and upright in form. Each of these smelting chambers is provided with a plurality of combustion chambers opening laterally into the said smelting chambers, each combustion chamber being provided with a fuel injector for injecting fuel in order to heat the main or smelting chambers. Leading from each smelting chamber is also an inclined inclosure divided by a grating into a roasting chamber and a circulating chamber. The two inclined inclosures are connected at their upper ends and at this point is attached a pipe through which the heated products of combustion and gases are drawn off over the ore in the roasting chamber by means of a suction fan. The said gases and products of combustion are then delivered to a carbureter in which they are enriched by the addition of any suitable fuel, either liquid or pulverized, after which the said gases and products of combustion are again returned to the smelter proper by means of a second suction fan. Before being returned to the furnace proper the gases are first passed through super-heating pipes arranged adjacent to the smelting chambers and are then delivered to the various combustion chambers hereinbefore referred to.

Reference is to be had to the accompanying drawings forming a part of this specification, in which similar characters of reference indicate corresponding parts in all the figures.

Figure 2:
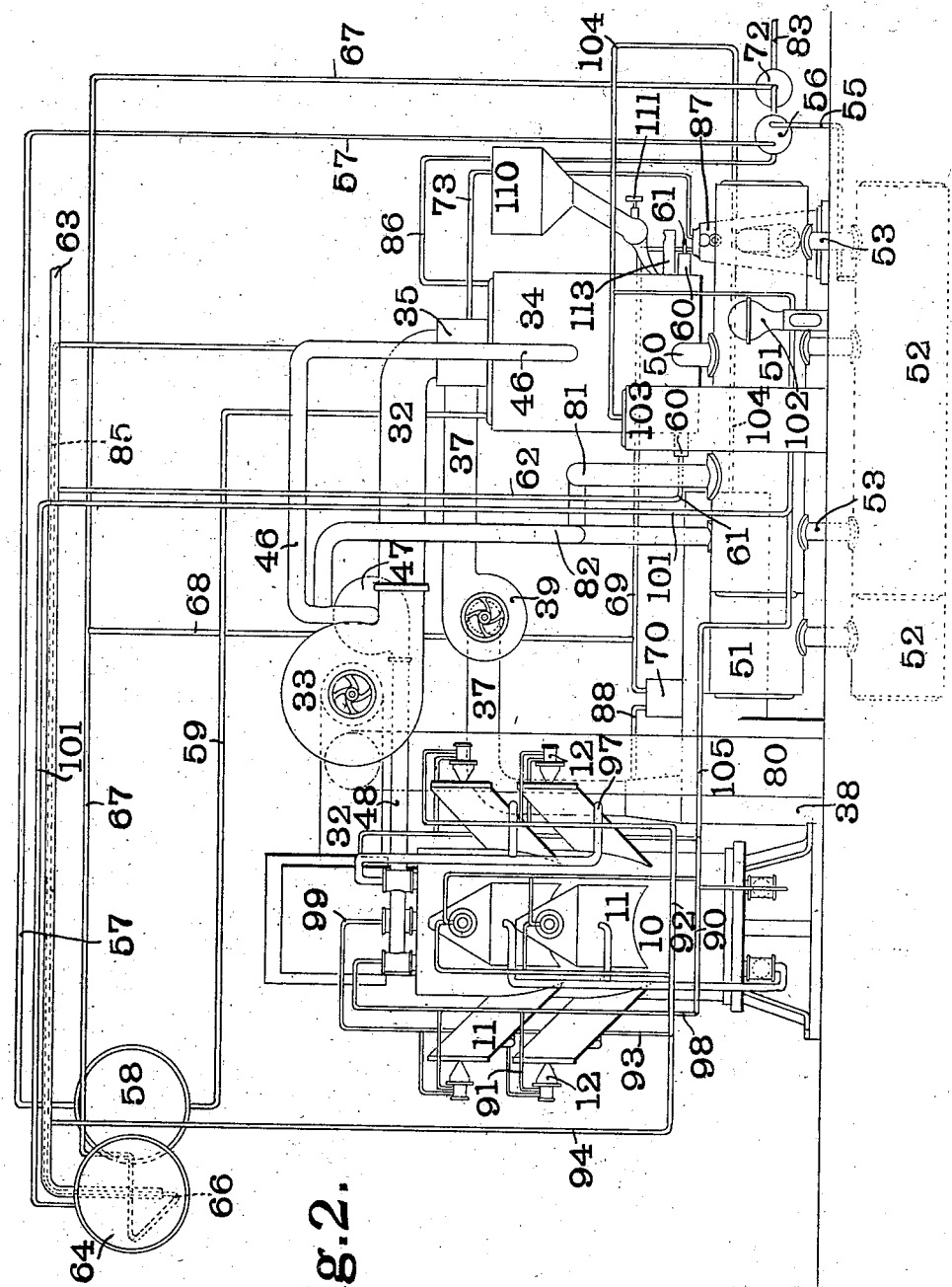

Figure 1 is a diagrammatic top plan view of the complete apparatus; Fig. 2 is a diagrammatic side view; Fig. 3 is a central section on an enlarged scale through the smelter proper; Fig. 4 is an enlarged cross section through Fig. 6; Fig. 5 is a vertical section through the smoke box of a boiler showing the superheating coil 88[a] for raising the temperature of the gaseous products of combustion after the carbureting thereof; Fig. 6 is a top plan view, partly in section, of the parts shown in Fig. 3; and Figs. 7 and 8 are vertical sections through the carbureter, Fig. 8 being taken on a line at right angles to the section in Fig. 7.

I will now describe my process more particularly in connection with the form of furnace by means of which I prefer to carry it on in practice.

At 10 are the two smelting chambers, which are preferably cylindrical and upright in form. Opening laterally off these smelting chambers 10 are the combustion chambers 11, which are preferably arranged at an angle of about 45° with the said main or smelting chambers 10. Each of these combustion chambers 11 is provided with a fuel injector 12, which is provided with a supply of fuel and steam by pipe connections, which will be hereafter described.

13 are inclined inclosures, preferably arranged at an angle of about 45°. Each of these inclosures is divided by means of a grating of water tubes 14 into an upper or roasting chamber 15 and a lower or circulating chamber 16. The ends of the pipes 14 are secured in boxes 17, which in turn are connected by means of pipes 18 and 19 with water drums 20 arranged at each side of and slightly above the said inclined inclosures 13. The roasting chambers 15 are separated from the smelting chambers 10 by means of sliding doors 21, each of which doors is provided with a grating formed of water tubes 22. The ends of these water tubes 22 are connected to the tubes 18 by means of jointed tubes 23, so as to allow the doors 21 to be raised and lowered. The doors 21 are preferably raised and lowered by means of pneumatic or steam hoists 25, as shown in Fig. 3. The chambers 15 are each intended to contain a charge of ore, which is roasted in said chamber while the preceding charge of ore is being smelted in the smelting furnaces 10. The upper end of each of the roasting chambers 15 is provided with a swinging door 26, so that the upper end of the said chambers can be opened for the insertion of the charge of ore. Such charge of ore is preferably inserted by means of a hopper 27 which is provided with a slide 28 and a telescopic portion 29. The said telescopic portion 29 is adapted to be lowered into the position shown in Fig. 3, so that when the slide 28 is drawn the contents of the hopper 27 will be discharged into the roasting chamber 15. Leading from the point of junction of the two circulating chambers 16 is a pipe 32 through which the heated products of combustion and unconsumed gases are drawn off by means of a fan 33. These gases and products of combustion are then discharged into a carbureter 34, as shown in detail in Figs. 7 and 8. The pipe 32 leading from the fan 33 has an enlarged end 35 which passes down through the carbureter 34, and is preferably slightly belled at the end, as shown at 36. Opening into the enlarged portion 35 is a second pipe 37, which leads from the smoke stack of the boiler 38. The fan 39 is provided for drawing off the products of combustion and heated gases from the boiler 38 through the pipe 37 and discharging them into the lower enlarged end 35 of the pipe 32. Arranged just above this crucible 40 is a perforated diaphragm 41 and above said diaphragm 41 is an imperforate diaphragm 42.

Passing through these two diaphragms 41 and 42 are a plurality of pipes 43, preferably made of two different lengths, as clearly shown in the drawings. These pipes are arranged annularly in close proximity to the outer shell of the carbureter 34, and their object is to allow the passage of oil or oil and water through the space separated by the diaphragms 41 and 42. This construction enables the carbureter to perform the functions of a jet condenser, thus assisting the draft of the furnace, as hereinafter more fully described. Between the diaphragms 41 and 42 and closely surrounding the pipes 35 is a gas generating chamber 45. Leading from this gas generating chamber 45 are a pair of pipes 46 which are connected to a suction fan 47. Leading from the fan 47 are a pair of pipes 48 which return the gases and heated products of combustion to the smelter proper. Leading from the carbureter 34 below the crucible 40 are a pair of pipes 50 which are, in turn, connected to separating tanks 51. Below each of the separating tanks 51 is arranged a dead oil tank 52 with which it is connected by means of pipes 53. Leading from the two dead oil tanks 52 is a pipe 54 which is connected by means of a pipe 55 with a pump 56. Leading from the pump 56 is a pipe 57 through which the dead oil from the tanks 52 is pumped into a reservoir 58. 59 is a return pipe from the reservoir 58, through which the dead oil is returned to the carbureter 34.

In order to prevent the carbureter from falling to too low a temperature, I prefer to provide it with a pair of burners 60. These burners 60 are each provided with an oil pipe 61 by means of which the oil is supplied to the burner. These pipes 61 are connected to a pipe 62 which leads from a pipe 63 communicating with the fuel oil tank 64. The pipe 62 is also connected with the burner 65 of the boiler 38.

In order to heat the fuel oil in the tank 64 I provide a steam coil 66 in said tank. This coil 66 is supplied by steam from a pipe 67, which is connected by a pipe 68 with a pipe 69. The said pipe 69 is connected to the steam drum 70 of the boiler 38. The pipe 67 is connected to the steam cylinder of the steam pump 56 hereinbefore referred to and also to the steam cylinder of a second pump 72. The exhaust of the steam cylinders from both the pumps 56 and the pump 72 passes through a pipe 73 to the carbureter 34. The suction end of the pump cylinder of the pump 72 is connected by means of a pipe 74 with a retort 75 connected with the gas generating chamber 45 of the carbureter 34 and the said suction end of the said cylinder is also connected by means of a pipe 76 with a series of separating chambers 77 in a passage 78 leading to a well 79. The passage 78 receives the discharge from a relief pipe 60 extending from the pipe 32. It also receives the discharge from a relief pipe 81. The pipe 81 is connected with the separating tank 51 and also through a pipe 82 with the pipe 7 and the pipes 46. 83 is the discharge pipe from the pump cylinder of the pump 72. This pipe 83 may lead to any suitable receptacle of the various products withdrawn from the carbureter 34 and the separating chamber 77. The carbureter 34 also receives the exhaust from the heating coil 66 in the fuel oil tank 64. This exhaust passes from the coil 66 through a pipe 85 passing along within the pipe 63. Exhaust steam is also supplied to the carbureter 34 through a pipe 86 leading from the engine 87. At the same time that exhaust steam is supplied to the carbureter through the pipe 86, water and dead oils are supplied to the carbureter through a pipe 59, thus causing the carbureter to perform the functions of a jet condenser, taking back pressure off both the engine and fans and assisting the draft of the furnace as well as protecting the outer shell of the carbureter. The engine 87 is used to drive the various exhaust fans by means of suitable counter-shafting and belting, which are not shown in the drawing. The engine 87 is supplied with steam by means of the pipe 69 hereinbefore described. Leading from the steam dome 70 of the boiler 38 is a pipe 87. The pipe 87 is connected with a super-heating coil 88ª arranged in the smoke box of the boiler, as clearly shown in Fig. 5 of the drawing. Connected with the coil 88ª is a pipe 89, which is in turn connected to the pipe connections 90 surrounding the two smelting chambers 10. Leading from the pipe connections 90 to each of the fuel injectors 12 is a branch connection 91.

92 are oil pipe connections also surrounding the smelting chambers 10. Leading from these oil pipe connections 92 to each of the burners 12 is a branch pipe 93. The oil pipe connections 92 are supplied by means of a pipe 94 leading from the pipe 63. 95 are super-heating pipes which are arranged adjacent to the smelting chambers 10. These super-heating pipes 95 are preferably four in number for each smelting chamber, and they are arranged as clearly shown in Fig. 6, so as to form a continuous passage, one end of each of said passages being connected to one of the pipes 48 leading from the carbureter.

Leading from one end of each of the super-heating pipes 95 is a branch pipe 97, which leads into one of the combustion chambers 11, so as to discharge the super-heated gases into said combustion chamber. Leading into the opposite end of each of said super-heating pipes 95 is a branch pipe 98 leading from the steam pipe connections 90. The discharge nozzle 96 is also preferably provided with a supply pipe 99 leading from the oil pipe connections 92. In order to supply pressure on the fuel in the fuel tank 64, I connect to said tank an air pipe 101 leading from an air pump 102. This pump 102 also connects with an air tank 103 so that the supply of air may be retained on hand after the plant is shut down in order to readily start the plant into operation. Leading from the tank 102 and tank 103 are two pipes 104 and 105. The pipe 104 leads to the burner 65 of the boiler 38 hereinbefore described and the pipe 105 leads to the pipe 89 connected to the steam pipe connections 90 so that in starting up the plant, or if desired at any other time, compressed air may be used in the steam pipe connections 90 in place of steam. In addition to the liquid fuel fed to the carbureter 38 I may also provide a hopper 110, as shown in Figs. 2 and 8 for receiving pulverized fuel, which may be fed into the crucible 40 by means of a screw 111. Arranged preferably below the discharge 112 from the hopper 110 is a pipe 113 leading from the crucible 40 and provided with an opening 114. Through this opening the gas within the carbureter 34 may be tested to discover when it is of sufficient richness to enable it to be drawn off through the pipe 46 and supplied to the smelting chambers. The pipes 59, 73, 85 and 86 are provided with valves 115, 116, 117 and 118, respectively. By means of these valves the supply of exhaust steam, oil and water to the carbureter may be regulated. In like manner the pipes 46 leading from the carbureter are supplied with valves 119 so that the supply of gases from the carbureter to the furnace may be regulated. By means of these valves the temperature in the smelting furnace can be accurately regulated, so that the furnace may be brought to and maintained at any suitable degree of temperature. The temperature of the furnace may be regulated by the valve 115, 116, 117 or 118 alone, or by the valve 119 alone. In practice, I prefer, however, to use both sets of valves, thus regulating not only the carbureting of the gases but also their return to the furnace. By this means I am enabled to treat ores containing various metals and to obtain each metal in a substantially pure state. In order to do this I bring the furnace to and hold it at a temperature equal to the smelting point of the metal having the lowest smelting point. The furnace can be retained at this temperature until the furnace can be raised to the melting point of the metal having the next highest melting point and held at this temperature until the second metal is entirely removed from the ore and this process may be repeated with each metal until all are removed.

As shown in the drawings, the valves 115, 116, 117 and 118 are hand-operated, but it will be understood that they may be automatically controlled by means of thermostats. In practice it will be preferable to obtain the regulation automatically by means of thermostats. Inasmuch, however, as the use of thermostats for similar purposes is old and well-known, I have not deemed it necessary to show any specific form of thermostat in the drawings.

It is possible that some unfused metals may be alloyed to some extent with fused metals. The degree of such alloying, however, is very slight, the net result being that the metals of comparatively lower melting point may, when separated by my process, contain traces of other metals of slightly higher melting point. This is not particularly objectionable. As is well-known in this art the separation of lead from silver is readily brought about by cooling the admixture to such a point that it solidifies. The fact that the lead after separation contains traces of silver, and that the silver may contain more or less lead as an impurity, does not prevent the process from being operated successfully. So it is with my method; a slight admixture of one metal with an impurity in another may not be particularly objectionable, especially as the metals are sometimes afterward used for such purposes as would necessitate the admixture of more or less alloy therewith.

In carrying out my process, ore is first placed in the smelting chambers 10, so that when the first charge of ore is smelted it has not been previously roasted. In all succeeding charges, however, the charge is roasted before being admitted to the smelting chamber 10. In the regular operation of the process the charge of roasted ore is admitted from the roasting chamber 15 to the smelting chamber 10 by means of the movable gate 22, after which a fresh charge of ore is placed in the chamber 15 to be roasted. The chamber 10 is heated by means of the combustion taking place not only in the said chamber itself, but also in the combustion chambers 11 opening laterally from the main chamber. Fuel is supplied through the pipe 96 and through the burners 12, and also through the pipes 97. The products of combustion containing any unconsumed combustible matter and also any metal which may have been volatilized in the smelting chamber is drawn off through the pipe 32 and thence carried to the carbureter 34, while in the carbureter 34 the various gases are enriched by means of fuel fed into the carbureter, as hereinbefore described, either in pulverized or liquid form. After being enriched, the gases are returned to the pipes 46 and 48 to the super-heating pipes 95 surrounding the smelting chambers. In these pipes the gases are thoroughly super-heated and the steam contained in the gases decomposed to a greater or less extent into oxygen and hydrogen, after which the gases are fed to the furnace through the pipe 96 and into the combustion chambers 11 through the pipes 97. By regulating the valves 115, 116, 117 and 118 the smelting furnace can be held at any desired temperature as hereinbefore described, so that the desired metals can be separated from the ore in the order of their fusibility. In addition to the products in metallic form, obtained directly from the smelting furnaces 10 through the discharge pipes 107, I find that some of the metals are carried over into the carbureter 34 and can be obtained from the said carbureter in the form of oxids or other chemical compounds. For instance, if lead and zinc are contained in the ores a certain amount of lead would be deposited in the carbureter in the form of litharge in the process of smelting the lead, and during the process of smelting the zinc a certain amount of the zinc would be deposited in the said carbureter in the form of zinc white. Other valuable by-products are also obtained from the carbureter through the retort 75.

Since the point at which dissociation of the steam into oxygen and hydrogen does not take place suddenly, it may happen that when a part of the steam is dissociated such steam as does not become dissociated is simply exposed to a high degree of heat in contact with carbonaceous gases and vapors, being thus caused to unite therewith so as to form perfect gases which are afterwards carried into the furnace.

Having thus described my invention, I claim as new and desire to secure by Letters Patent:—

1. The process of smelting ore, which includes heating the ore in contact with a combustible, so as to liberate gases and other volatile products, withdrawing said gases and other products, adding steam to said gases and other products, subjecting the admixture to a temperature high enough to partially dissociate said steam, and returning the resulting aeriform body to the smelting zone of the furnace.

2. The process of smelting ore, which includes heating a charge of ore in contact with a combustible substance, so as to liberate gases and other volatile products, withdrawing the latter and passing them over a second charge of ore, adding steam to them, superheating them in contact with said steam, and returning the resulting aeriform body to the smelting zone of the furnace.

3. The process of smelting ore, which consists in subjecting the ore to the action of a combustible body so as to liberate gases and other volatile products, withdrawing said gases and other volatile products, carbureting the same, adding steam to said gases and other volatile products, subjecting the entire admixture to a temperature higher than that used in carbureting, and returning the resulting aeriform body to the smelting zone of the furnace.

4. The process of smelting ore, which includes subjecting the ore to the action of a combustible body, so as to liberate gases and other volatile products, withdrawing said gases and volatile products, adding steam to them, superheating them and said steam to a temperature higher than that of either said gases or other products, or said steam, and returning the resulting aeriform body to the smelting zone of the furnace.

5. The process of smelting ore, which includes subjecting the ore to the action of a combustible body so as to liberate gases and other volatile products, withdrawing said gases and other volatile products, passing them over a second charge of ore, carbureting them, adding steam to them, raising the temperature of the admixture to a higher degree than that at which carbureting takes place, and returning said products to the smelting zone of the furnace.

6. The process of smelting ore, which includes heating said ore by aid of a combustible substance so as to release gaseous products, carbureting said products, regulating the carbureting of said products with relation to the temperature, and returning said products to the smelting zone of the furnace.

7. The process of smelting ore, which includes heating a charge of ore in the presence of a combustible substance so as to withdraw the gaseous and other volatile products, passing them over a second charge of ore, carbureting said products, adding steam to said products, preventing reduction of temperature in said products after said steam added, returning said products to the smelting zone of the furnace, and regulating the carbureting and return of said products to maintain the ore at a predetermined temperature.

8. The process herein described of smelting ore, which includes heating a charge of ore so as to withdraw therefrom the gaseous volatile products, carbureting said products, raising steam by utilizing waste heat, bringing said steam into contact with said products, and finally superheating the admixture and returning it to the zone of combustion.

In testimony whereof, I have hereunto my hand and affixed my seal in the presence of the two subscribing witnesses.

FREDERICK L. McGAHAN. [L. S.]

Witnesses:
    EDGAR W. JACOBS,
    W. A. ALEXANDER.